United States Patent
Hill

(10) Patent No.: US 8,662,193 B2
(45) Date of Patent: Mar. 4, 2014

(54) METHOD AND APPARATUS TO COLLECT CORES FROM GOLF GREEN

(76) Inventor: James E Hill, Waddell, AZ (US)

(*) Notice: Subject to any disclaimer, the term of this patent is extended or adjusted under 35 U.S.C. 154(b) by 243 days.

(21) Appl. No.: 13/199,261

(22) Filed: Aug. 24, 2011

(65) Prior Publication Data

US 2013/0048320 A1   Feb. 28, 2013

(51) Int. Cl.
  A01B 45/00   (2006.01)
(52) U.S. Cl.
  USPC .............................. 172/21; 171/63
(58) Field of Classification Search
  USPC .......... 172/21, 22; 15/257.1, 340.1; 294/50.9; 171/63
  See application file for complete search history.

(56) References Cited

U.S. PATENT DOCUMENTS

| | | | | |
|---|---|---|---|---|
| 3,429,378 A | * | 2/1969 | Mascaro | 172/22 |
| 3,797,578 A | * | 3/1974 | Velasquez | 172/22 |
| 4,884,637 A | * | 12/1989 | Rohleder | 172/22 |
| 5,069,293 A | * | 12/1991 | St. Romain | 172/22 |
| 5,305,834 A | * | 4/1994 | White | 171/63 |
| 5,423,386 A | * | 6/1995 | Lapearous | 172/22 |
| 6,092,607 A | * | 7/2000 | Bercheny et al. | 171/63 |
| 6,253,858 B1 | * | 7/2001 | Warke | 172/22 |
| 6,321,849 B1 | * | 11/2001 | Underhill | 172/22 |
| 6,550,705 B2 | * | 4/2003 | Pfisterer | 241/101.76 |
| 6,805,205 B1 | * | 10/2004 | Gabard | 172/22 |
| 6,986,393 B1 | * | 1/2006 | Johnston et al. | 172/21 |
| 7,066,275 B1 | * | 6/2006 | Keigley | 171/63 |

* cited by examiner

*Primary Examiner* — Jamie L McGowan
(74) *Attorney, Agent, or Firm* — Tod R. Nissle, P.C.

(57) ABSTRACT

A method to collect soil cores from a green comprises the steps of providing a soil core collector, extracting soil cores from a green, allowing the cores to dry for at least fifteen minutes, and utilizing the core collector to gather the cores from the green.

1 Claim, 8 Drawing Sheets

METHOD AND APPARATUS TO COLLECT CORES FROM GOLF GREEN

This invention relates to a soil core collector.

A variety of equipment and procedures have existed for the purpose of removing soil cores from a golf green. There has long existed a motivation to improve such existing systems.

Therefore, it is a principal object of the instant invention to provide an improved system and apparatus to collect soil cores from a golf green or other area of ground.

This and other, further and more specific objects and advantages of the invention will be apparent to those skilled in the art from the following detailed description thereof, taken in conjunction with the drawings, in which.

Briefly, in accordance with the invention, provided is an improved method to collect soil cores from the surface of a golf green. The method includes the step of providing soil core collector apparatus. The soil core collector apparatus includes a prime mover. The prime mover has a selected weight and at least three ground engaging tires, each of said tires having a selected tread diameter, width, and ground contact area such that said prime mover generates less than one hundred psi on the surface of the golf green. The prime mover has a top speed of at least five miles per hour. The soil core collector apparatus also includes a soil core collector sled attached to the prime mover. The soil core collector sled includes a housing, and a plurality of contiguous linked shovels. Each shovel is shaped and dimensioned to contact and slide over the surface of the green, and includes a leading portion shaped and dimensioned to lie, when the shovel sets on the surface of the green, flat on the surface of the green. The leading portion includes a leading edge with a squared off surface canted with respect to the surface of the green when the shovel sets on the surface of the green, and includes a trailing portion connected to the leading portion and shaped and dimensioned to cant, when the shovel sets on the surface of the green, upwardly away from the leading portion and the surface of the green at an angle of less than nine degrees. The soil core collector sled has at least two operative positions on the prime mover, a first deployed operative position with the shovels set on the surface of the green such that the prime mover can pull the sled over the surface of the green to collect soil cores, and a second stowed position with the sled raised away from the surface of the green. The improved method also includes the steps of aerating the green by extracting soil cores from the green and leaving the extracted soil cores scattered on the surface of the green; waiting at least fifteen minutes for the extracted soil cores to dry; positioning the soil core collector sled in the first deployed operative position; and, moving the prime mover and the soil core collector sled over the surface of the green at at least five mph to collect the extracted soil cores from the surface of the green.

Figure 1:
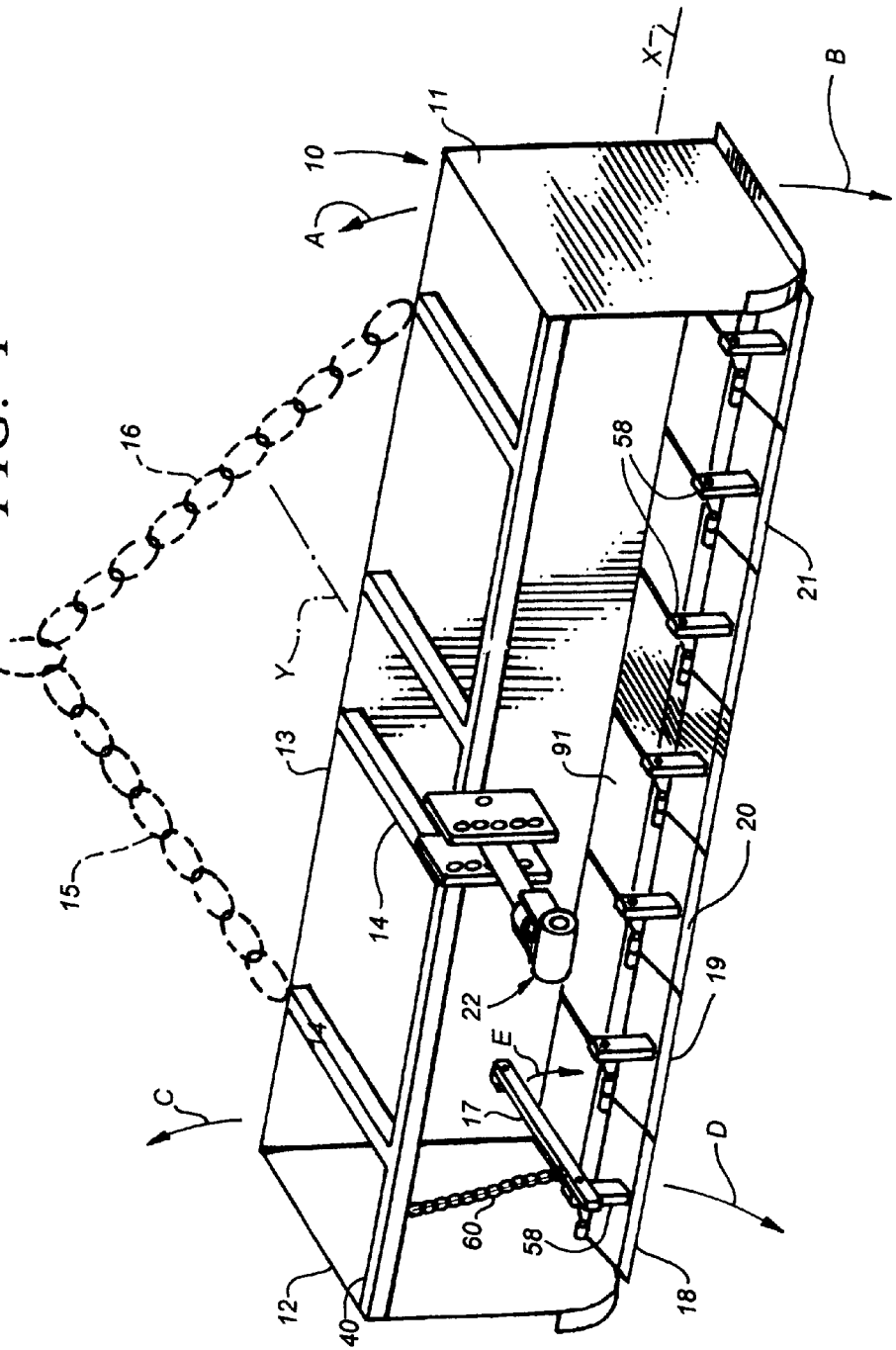
FIG. 1 is a perspective view illustrating a soil core collector sled constructed in accordance with the principles of the invention.
Figure 2:
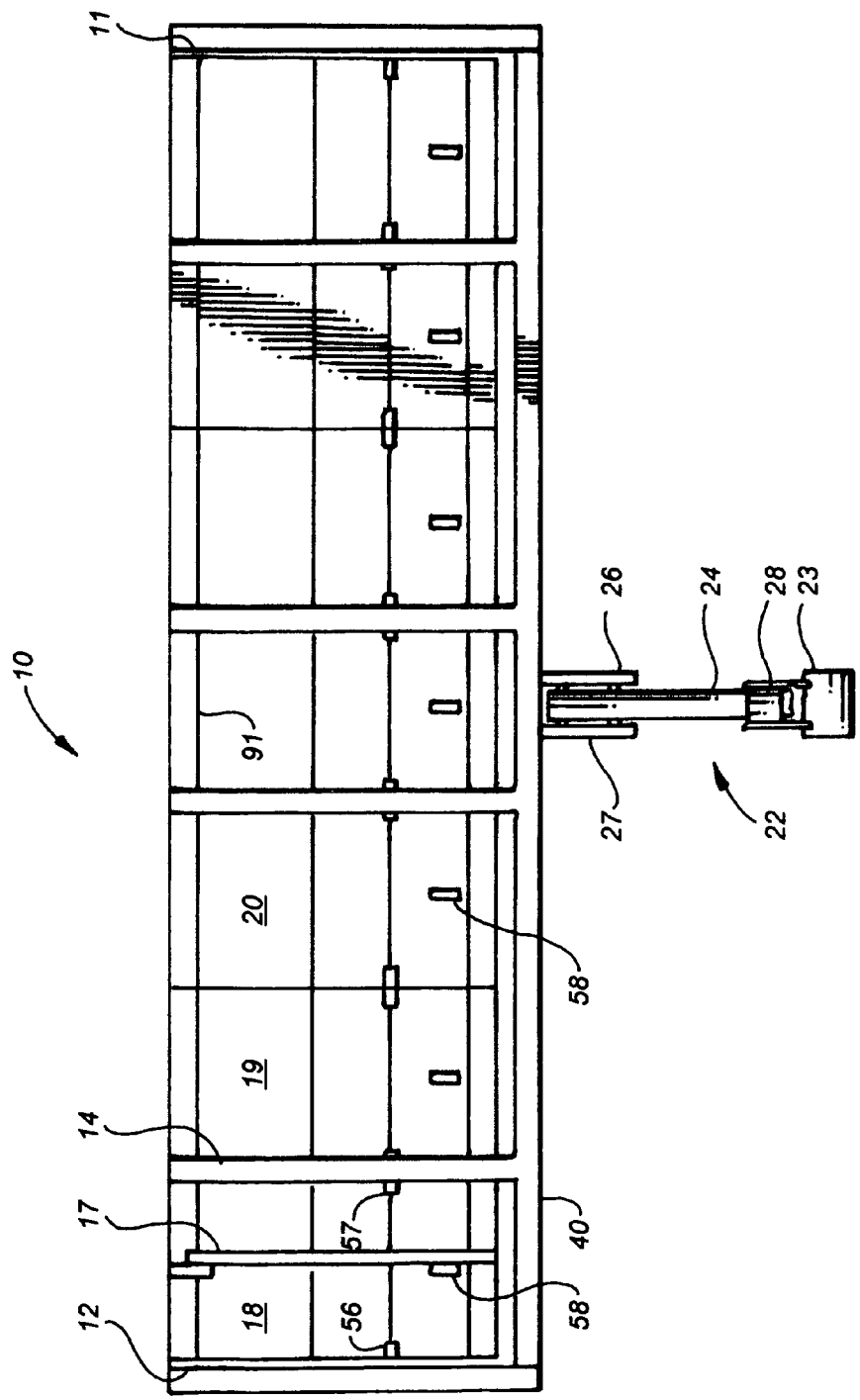
FIG. 2 is a top view illustrating the soil core collector sled of FIG. 1.

Turning now to the drawings, which depict the presently preferred embodiments of the invention for the purpose of illustrating the practice thereof and not by way of limitation of the scope of the invention and in which like reference characters refer to corresponding elements throughout the several views, FIGS. 1 and 2 illustrate a soil core collector sled constructed in accordance with the principles of the invention and generally indicated by reference character 10. Sled 10 includes a housing with vertically oriented spaced apart sides 11 and 12, vertically oriented back 13 extending between and interconnecting sides 11 and 12, horizontally oriented support member 40 extending between and interconnecting sides 11 and 12, and spaced apart horizontally oriented ribs 14 extending between and interconnecting back 13 and support member 40. Plates 26, 27 (FIG. 2) of hitch assembly 22 are fixedly attached to member 40. Hitch assembly 22 is described in more detail below with reference to FIG. 5.

Contiguous shovels 18, 19, 20, 21 are loosely linked together such that the elevation of one shovel 18 can vary slightly with respect to the elevation of an adjacent shovel 19. This permits shovels 18 to 21 to adapt more readily to variations in the surface contour of a green. Such a "loose linkage" between adjacent shovels is explained in more detail below with reference to FIG. 3. The shape and dimension of one shovel 18 is equivalent to that of the remaining shovels 19 to 21, although that need not be the case.

Figure 6:
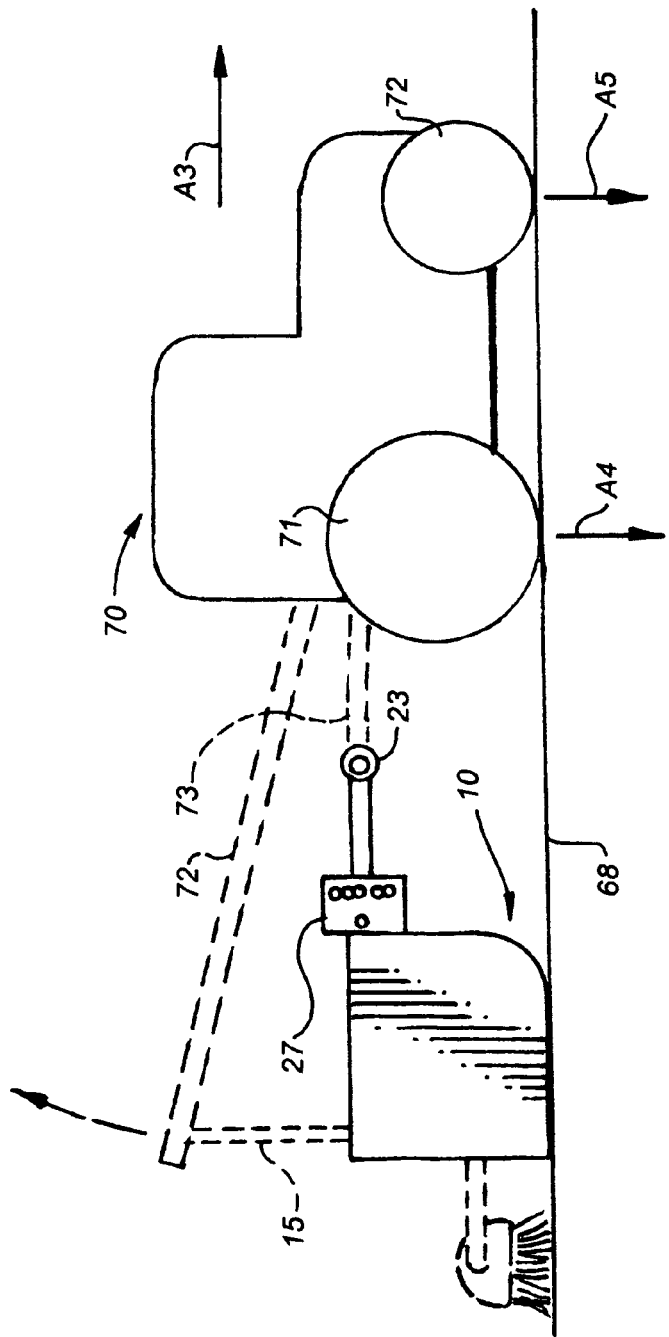
FIG. 6 is a side elevation view illustrating the mode of operation of the soil core collection system of the invention.
Figure 7:
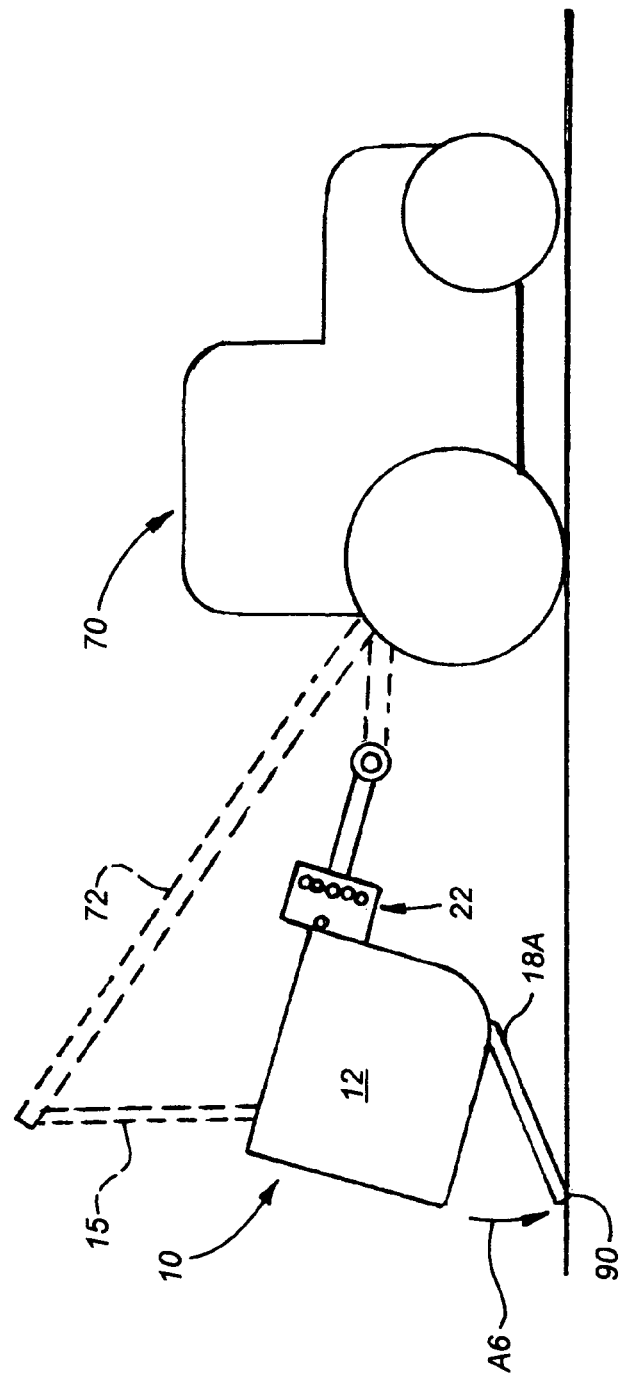
FIG. 7 is a side elevation view further illustrating the mode of operation of the soil core collection system of the invention; and, FIG. 8 is a side view of a tire of the type utilized an a prime mover in the system of the invention.

Each shovel 18 to 21 includes an upstanding leg 58 fixedly connected to the top of the shovel. A support arm 17 includes a front end pivotally connected to leg 58 and another rear end pivotally connected to back 13. In FIGS. 1 and 2 only a single support arm 17 is, for sake of clarity, illustrated. The end of support arm 17 pivotally connected to leg 58 is also fixedly attached to the lower end of support chain 60. The upper end of chain 60 is fixedly connected to support member 40. FIGS. 1, 2, and 6 illustrate soil core collector sled 10 in a deployed operative position setting on the ground. FIG. 7 illustrates sled 10 in a stowed position in which a crane 72 attached to the rear of prime mover 70 is operated to lift sled 10 from its deployed operative position up away from the ground. When sled 10 is lifted off the ground from the deployed position of FIGS. 1, 2, 6, the rear end 90, 91 (FIGS. 1-4, 7) of each shovel 18 to 21 drops downwardly under gravity in the manner illustrated in FIG. 7. When rear end 90, 91 drops down, leg 58 pivots about the front end of support arm 17. Support arm 17 remains stationary because the front end of arm 17 is held in position by chain 60 and because the back end of arm 17 is secured to back 13.

Figure 3:
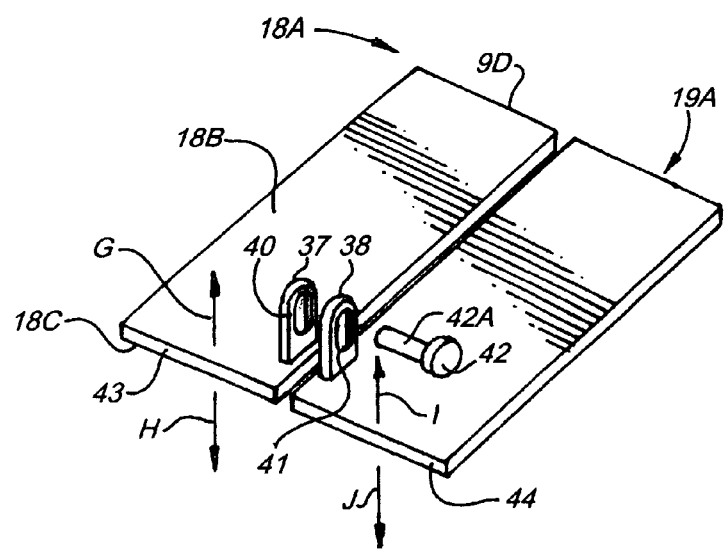
FIG. 3 is a perspective view illustrating a pair shovels which are loosely linked together and can be utilized in the soil core collector sled of FIG. 1.
Figure 4:
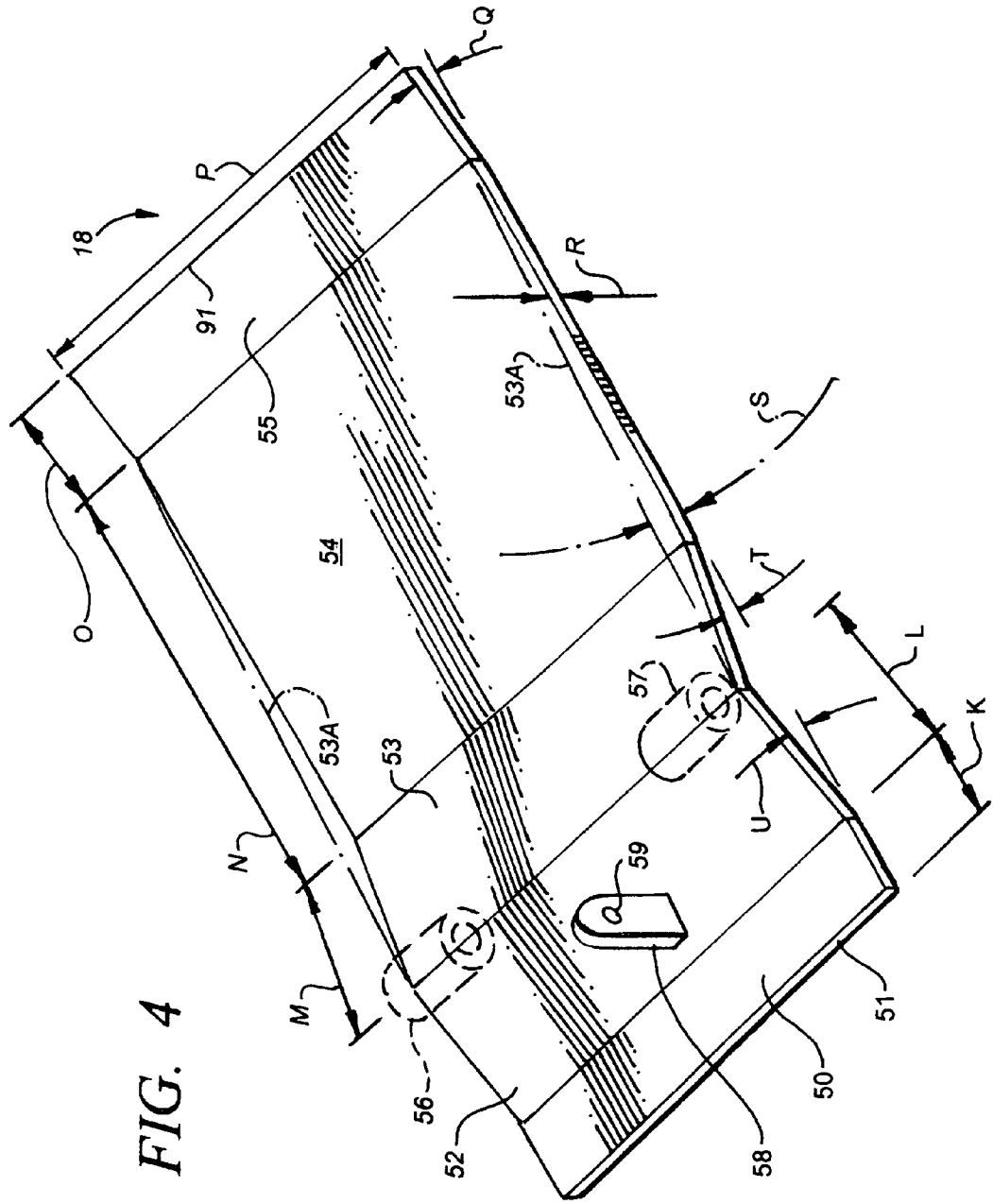
FIG. 4 is a perspective view illustrating alternate shovel constructions which can be utilized in the practice of the invention.

FIG. 3 illustrates in more detail the loose linkage between adjacent shovels 18A and 19A. Shovels 18A and 19A comprise flat rectangular plates. While shovels 18A and 19A can be utilized in the soil core collector sled 10 in the practice of the invention, shovels of the type illustrated in FIG. 4 are presently preferred. Upstanding legs 37 and 38 each are provided with an upwardly extending ovate opening 40 and 41, respectively. Openings 40 and 41 are sized such that the legs 42A of a fastener 42 will, when inserted through openings 40 and 41, slide a short distance upwardly or downwardly, as the case may be, in openings 40 and 41. This permits each shovel 18A to move or "float" upwardly (in the direction of arrow G) or downwardly (in the direction of arrow H), as appropriate, a short distance with respect to shovel 19A and facilitates the adaptation and conforming of shovels 18A and 19A to the undulations of a golf green. Similarly, shovel 19A can move or "float" upwardly (in the direction of arrow I) or downwardly (in the direction of arrow J) with respect to shovel 18A. Shovel 18A includes a squared off leading edge which includes rectangular surface 43 that is normal to the flat upper surface 18B and flat lower surface 18C of shovel 18A. Shovel 19A includes an equivalent surface 44. Surfaces 43 and 44 currently are, when shovels 18A and 19A rest on the generally horizontal surface of a golf green, normal to the surface of the green. Surfaces 43 and 44 can, however, be canted with respect to the horizontal surface of the green at angles other than ninety degrees. Such angles preferably are in the range of less than or equal to about thirty degrees forwardly or rearwardly from normal, preferably in the range of less than or equal to about fifteen degrees forwardly or rearwardly from normal. It is important in the practice of the invention to avoid turning the leading edge of a shovel 18A, 19A, 18 to 21 into a knife edge. Each surface 43, 44 presently is at least one-sixteenth of an inch, preferably at least one-eighth of an inch high, and, is no more than one-fourth of an inch high, preferably no more than three-sixteenths of an inch high.

The shovel 18 illustrated in FIG. 4 is shown in an orientation in which shovel 18 is setting on a horizontal green surface when sled 10 is in the deployed position of FIGS. 1 and 6. Shovel 18 includes hollow cylindrical members 56 and 57 which are fixedly secured to the top of shovel 18, and are shaped and dimensioned to function and provide "loose linkage" between shovels 18 to 21 in the same manner as that described with respect to legs 37 and 38 in FIG. 3.

Shovel 18 includes leading portion 50 which is parallel to and contacting the horizontal green surface. Rectangular surface 51 is perpendicular to the horizontal green surface. Leading portion 50 is connected to a first trailing portion 52. Portion 52 angles or cants upwardly away from portion 50 and from the horizontal green surface at an angle, indicated by arrows U, of less than nine degrees, preferably less than eight degrees, and most preferably less than seven degrees. Angle U is at least two degrees. A second trailing portion 53 cants downwardly away from portion 52 and is canted to the horizontal green surface at an angle, indicated by arrows T, of less than nine degrees, preferably less than eight degrees, and most preferably less than seven degrees. Angle T is at least two degrees. A third trailing portion 54 is parallel to and contacts the horizontal green surface. The thickness of portion 54 is indicated by arrows R and is presently generally equal to the thickness of the leading portion 50 and other trailing portions 52, 53, 55. The thickness R is presently preferably in the range of about one-sixteenth to one-fourth of an inch, preferably one-eighth to three-sixteenths of an inch. A fourth trailing portion 55 cants upwardly away from portion 54 and from the horizontal green surface at an angle, indicated by arrow Q, of less than nine degrees, preferably less than five degrees, and most preferably less than four degrees. Angle Q can be zero, but is preferably at least two degrees.

The width, indicated by arrow K, of leading portion 50 can vary as desired but is presently three-fourths of an inch. The width, indicated by arrows L, of the first trailing portion 52 can vary as desired, but is presently three and one-quarter inches. The width, indicated by arrows M, of the second trailing portion 53 can vary as desired, but is presently three and one-quarter inches. The width, indicated by arrows N, of the third trailing portion 54 can vary as desired, but is presently nine inches. The width, indicated by arrows S, of the fourth trailing portion 55 can vary as desired, but is presently one inch.

In an alternate embodiment of the invention, the second and third trailing portions 53, 54 are combined into a single trailing portion which extends along the dashed lines 53A in FIG. 4.

Utilizing a leading portion 50 which is, when sled 10 is in the deployed position, parallel to and contacting the ground, important because it generally prevents the leading surface 51 from digging into and damaging the surface of a green. Similarly, utilizing a trailing portion which is at an angle of nine degrees or less is important in minimizing the risk that surface 51 will dig into the surface of a green.

Figure 5:
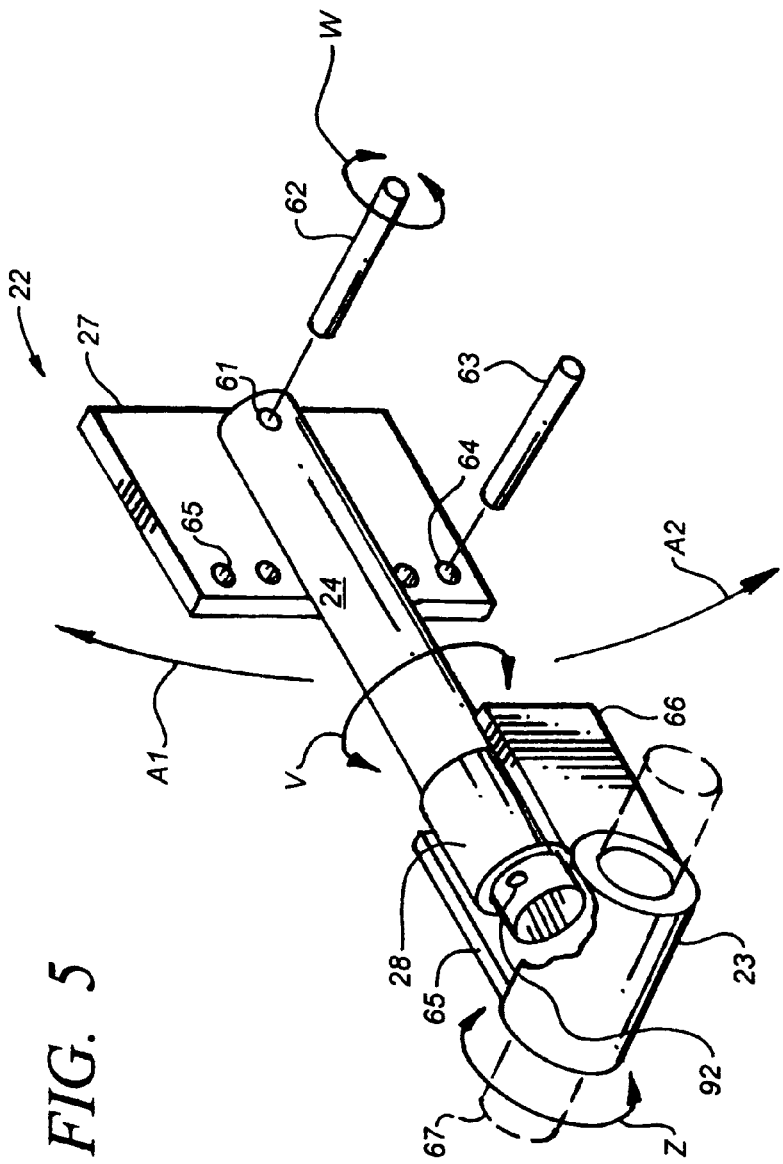
FIG. 5 is a perspective view illustrating a hitch assembly which can be utilized to secure adjustably the soil core collector sled to a prime mover.

Hitch assembly 22 is illustrated in greater detail in FIG. 5. Fixed plate 26 is omitted from FIG. 5 for the sake of clarity. Pin 62 extends through an aperture in plate 26 (not shown), through aperture 61 in arm 64, and through an aperture (not visible) in plate 27 such that arm 24 (and consequently sled 10) is free to pivot about pin 62 in the manner indicated by arrows W and A1 and A2. A pin 62 can be inserted through apertures in plates 26 and 27 and extend beneath (or above) arm 24 to serve as a stop which limits the distance that arm 24 can pivot in the direction of arrow A2 or arrow A1, as the case may be. Hollow cylindrical sleeve 28 is fixedly secured to plates 65 and 66, as is hollow cylindrical sleeve 23. One end of arm 24 slidably rotatably extends through sleeve 28. Once arm 24 is in the position illustrated in FIG. 5, a cotter pin is inserted through aperture 92 to prevent arm 24 from sliding out of sleeve 28. Arm 24 (and consequently sled 10) is, however, free to rotate in sleeve 28 in the directions indicated by arrows V. Sleeve 23 is slidably rotatably mounted on a member 67 which is removably fixedly secured to primer mover 70 so that sleeve 23 (and consequently sled 10) can rotate about member 67 in the manner indicated by arrows Z. The ability of portions of hitch member 22 to rotate in the manner described in this paragraph facilitates the ability of sled 10 to conform to contours in the surface of the green and, consequently, facilitates the ability of prime mover 70 to pull sled 10 over the surface of a green at relatively high rates of speed in excess of five mph or more.

The ability of sled 10, due to the construction of hitch assembly 22, to rotate about the Y axis in the manner indicated by arrows A and B is illustrated in FIG. 1. The ability of sled 10, due to the construction of hitch assembly 22, to rotate about the X axis in the manner indicated by arrows C and D is also illustrated in FIG. 1.

In FIG. 6, prime mover 70 includes a hoist assembly which can be utilized to lift sled off the surface of a green in the manner indicated in FIG. 7. The construction of prime mover 70 is important in the practice of the invention. In particular, before the surface of a green is aerate by removing soil plugs, the surface can typically support 350 to 550 psi. After soil cores are removed from the green, the green surface typically can only support 200 to 250 psi. If the weight of the prime mover is too great, which in the prior art is often the case, the wheels of the prime mover will form depressions in the green surface. During the process of developing the invention, a way was discovered to minimize or eliminate the risk that such depressions will be formed. Namely, a prime mover of the type utilized to treat sand traps is utilized, and the "knobby" wheels on such a prime mover are replaced with wheels having standard automobile wheel treads of the type illustrated in FIG. 8 and described below in more detail. One such prime mover is the Sand Pro™ 3050 (08703) sold by Toro and weighing 930 pounds. The Sand Pro has a ground speed in the range of zero to ten mph. The maximum ground speed of a Sand Pro is far in excess of the speed utilized with conventional coring equipment. When the Sand Pro is utilized in combination with tires of the type illustrated in FIG. 8, the Sand Pro typically generates fifty psi or less of pressure on the surface of a green. The Sand Pro is utilized only in combination with the soil core collector sled of the invention. Coring apparatus and/or other apparatus is not mounted on the Sand Pro in combination with the sled 10.

Figure 8:
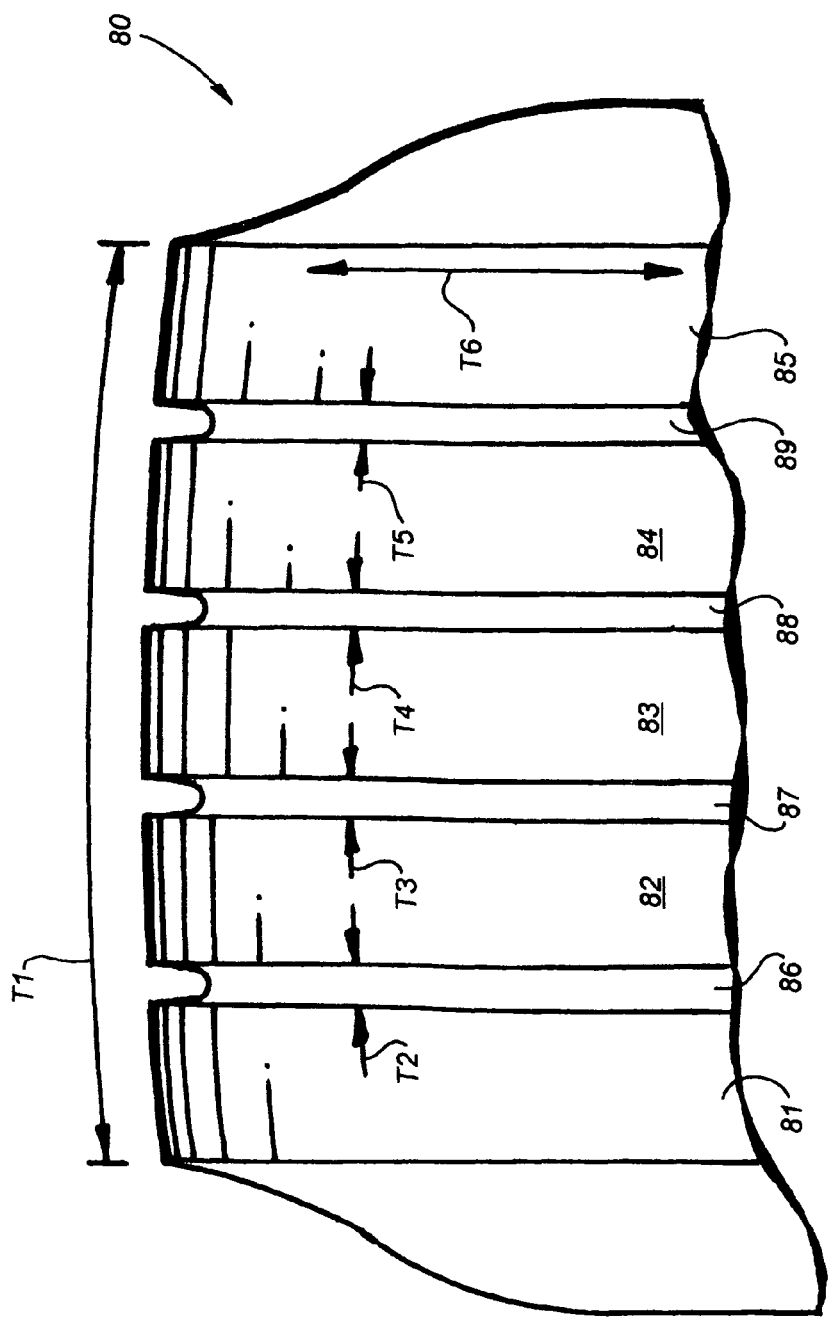

FIG. 8 illustrates a portion of a vehicle wheel 80 preferred in the practice of the invention. Wheel 80 does not have a tread which utilizes outwardly projecting spaced apart rounded dimples or "knobs". Such "knobby" treads have use in traversing a sand trap because the dimples penetrate and engage sand. During development of the invention, it was determined that this "penetration" function is at odds with one of the key invention objectives that was developed during production of the invention; namely, preventing the formation by the prime mover of detents in the surface of a green from which soil cores have been removed. The lateral distance across the peripheral tire tread surface in FIG. 8 is indicated by arrows T1. At least 50%, preferably at least 70%, most preferably at least 80% of this lateral distance T1 comprises relatively flat surface area which contacts and distributes the weight of prime mover 70 over surface of a green. Conversely, less than 50%, preferably less than 30%, and most preferably less than 20% of this lateral distance T1 comprises the width, indicated by arrows T2 and T3 and T4 and T5, of grooves which do not contact and distribute the weight of prime mover 70 over the surface of a golf green.

The tread in FIG. 8 includes five peripheral strips 81 to 85 which each extend around the outer circumference of tire 80. At least 50%, preferably at least 70%, most preferably at least 80% of each strip comprises arcuate surface area (having a radius generally equal to the radius of the tire) which will, when the tire rotates over the surface of a green, contact and distribute the weight of prime mover 70 over the surface of the green. Conversely, less than 50%, preferably less than 30%, and most preferably less than 20% of each strip comprises a groove or detent which does not contact and distribute the weight of primer mover 70 over the surface of a golf green when the prime mover is traveling over the surface of the green.

The combination of the weight of prime mover 70 and the tread design on the ground-contacting tires 80 of the prime mover should cause the tires to produce less than 100 psi, preferably less than 75 psi, more preferably less than 20 psi, and most preferably less than 10 psi when the prime mover 70 is pulling a deployed sled 10 over the surface of a green. In the presently preferred embodiment of the invention utilizing a Sand Pro™ prime mover weighing 930 pounds, less than five psi of pressure are produced on a green by the tires of the Sand Pro when the Sand Pro moves over the surface of the green. Consequently, in this presently preferred embodiment of the invention, less than five psi of pressure are produced on the surface of a green by the tires of the prime mover.

When a Sand Pro or other prime mover 70 is adapted to pull and lift a soil core collector sled 10 in accordance with the invention, it may be necessary to retrofit an existing hydraulic system with a larger hydraulic cylinder capable of lifting sled 10. In one embodiment of the invention, a Sand Pro prime mover 70 is modified by replacing a one and five-eighths diameter hydraulic cylinder with a two inch diameter hydraulic cylinder.

The greens on a golf course are periodically aerated by forming spaced apart cylindrical openings extending downwardly from the surface of the green. These cylindrical openings are then filled with sand. The cylindrical openings are formed by removing "cores" from the green. A "core" is a one-half to five-eighths inch diameter cylindrical plug which is typically four to seven inches long and is extracted from a green by punching a hollow cylindrical extractor bit into the green and then extracting the bit and core contained in the bit. When the extractor bit is forced into the surface of a green and is then extracted from the green, the bit pulls a cylindrical core out of the green. The core consists of dirt, grass, and grass roots. After the extractor bit is extracted from the green, the core is released on the surface of the green by the bit. When a green is cored in this fashion, the piece of equipment utilized has at least one row of spaced apart extractor bits, so that multiple cores are extracted from the green at the same time. The extracted cores which are scattered over the green surface are then removed from the green, either with a core gathering piece of equipment or by a group of workers that removed the cores with hand tools. The core gathering piece of equipment, when used, tends to drag core material over and "bridge" or seal ten to twenty percent of the cylindrical openings formed in the green. In the system of the invention, one important practice is to allow extracted cores to dry before a soil core collection sled 10 is utilized. It has been discovered that this practice greatly minimizes the proportion of cylindrical openings which are plugged by the sled 10. By way of example, and not limitation, when the ambient temperature is 110 degrees F., typically fifteen to thirty minutes is allowed for extracted soil cores to dry before soil core collection sled 10 is utilized to pick up the cores. If the ambient temperature is 70 degrees F., one and one half to two hours may be allowed for extracted soil cores to dry before soil core collection sled 10 is utilized to gather the soil cores from the surface of a green.

In one embodiment of the invention a kit is provided for use in connection with a Sand Pro™ or other selected prime mover. The kit includes a sled 10, and can also include a hitch assembly 22 to connect the prime mover to the sled 10 to tow sled 10 over the surface of a green, include a hoist assembly to connect the prime mover to the sled 10 to lift upwardly sled 10 away from the surface of a green, include apparatus to modify—if necessary—the hydraulic system of the Sand Pro or other prime mover to be able to lift sled 10 to the stowed position of FIG. 7, and include tires to replace "knobby" tires on the Sand Pro or other prime mover. The apparatus to modify the hydraulic system may, if appropriate and desirable, include a larger hydraulic cylinder and linkage or cam assemblies that are part of the hydraulic system. In some cases, the hydraulic system of a prime mover may not need to be modified, and the original equipment tires on the prime mover may not need to be replaced. In the currently preferred embodiment of the invention which utilizes a Sand Pro™ prime mover, the OEM tires are replaced and the hydraulic cylinder is replaced with a larger cylinder to increase the lifting capacity of the Sand Pro. Similarly, it is possible that the hitch and hoist assemblies of the prime mover will not need to be modified, although based on past experience, it appears likely that in many cases the hitch and hoist assembly will have to be modified. The sled 10 currently utilized in the practice of the invention weighs about one hundred pounds, although the weight of the sled can vary as desired.

Sled 10 can, if desired, be utilized on the tees and fairways of a golf course. The size and configuration of sled 10 can, if desired, be modified to better adapt sled 10 to tees and fairways. For example, the size and width of sled 10 can be increased such that the area covered by sled 10 is increased.

Having set forth our invention in terms to enable those skilled in the art to understand and practice the invention and having set forth the presently preferred embodiments and uses thereof,

I claim:

1. A method to collect soil cores from the surface of a golf green, comprising the steps of
   (a) providing soil core collector apparatus including
      (i) a prime mover having
         a selected weight and at least three ground engaging tires, each of said tires having a selected tread diameter, width, and ground contact area such that said prime mover generates less than one hundred psi on the golf green, and
         a top speed of at least five miles per hour, and
      (ii) a soil core collector sled attached to said prime mover and having
         a housing,
         a plurality of contiguous linked shovels shaped and dimensioned to contact and slide over the surface of the green, each of said shovels including
            a leading portion shaped and dimensioned to lie, when said shovel sets on the surface of the green, flat on the surface of the green, said leading portion including a leading edge with a squared off surface canted with respect to the surface of the green when said shovel sets on the surface of the green, and
            a trailing portion connected to said leading portion and shaped and dimensioned to cant, when said shovel sets on the surface of the green, upwardly away from said leading portion and the surface of the green at an angle of less than nine degrees,
         said soil core collector sled having at least two operative positions on said prime mover,
      (iii) a first deployed operative position with said shovels set on the surface of the green such that said prime mover can pull said sled over the surface of the green to collect soil cores, and
      (iv) a second stowed position with said sled raised away from the surface of the green;
   (b) aerating the green by extracting soil cores from the green and leaving the extracted soil cores scattered on the surface of the green;
   (c) waiting at least fifteen minutes for the extracted soil cores to dry;
   (d) positioning said soil core collector sled in said first deployed operative position; and,
   (e) moving said prime mover and said soil core collector sled over the surface of the green at least five mph to collect the extracted soil cores from the surface of the green.

* * * * *